(12) United States Patent
Childers et al.

(10) Patent No.: US 6,877,117 B1
(45) Date of Patent: Apr. 5, 2005

(54) OPTICAL SIGNAL RECEIVER AND METHOD WITH DECISION THRESHOLD ADJUSTMENT BASED ON A RELATIVE PERCENTAGE ERROR INDICATOR

(75) Inventors: Mark Childers, Finksburg, MD (US); Arthur P. Massaro, Jr., Severna Park, MD (US); Jeff Werner, Forest Hill, MD (US); John Kai Andersen, Emmaus, PA (US)

(73) Assignee: Ciena Corporation, Linthicum, MD (US)

( * ) Notice: Subject to any disclaimer, the term of this patent is extended or adjusted under 35 U.S.C. 154(b) by 574 days.

(21) Appl. No.: 09/916,367

(22) Filed: Jul. 27, 2001

(51) Int. Cl.[7] ............... G06F 11/00; H03M 13/00; H04L 27/06
(52) U.S. Cl. ............... 714/704; 714/751; 375/340
(58) Field of Search ............... 714/704, 751; 375/340, 225

(56) References Cited

U.S. PATENT DOCUMENTS

| | | | | |
|---|---|---|---|---|
| 5,325,397 A | * | 6/1994 | Scholz et al. | 375/224 |
| 6,115,157 A | * | 9/2000 | Barnard et al. | 398/1 |
| 6,307,899 B1 | * | 10/2001 | Starr et al. | 375/340 |
| 6,487,352 B1 | * | 11/2002 | Sobiski et al. | 385/122 |

FOREIGN PATENT DOCUMENTS

EP 1 085 713 A2 3/2001
WO WO 03/13030 A2 2/2003

OTHER PUBLICATIONS

Ohta et al., "Automatic Threshold–Level Control (ATC) for Optimum Decision Operation in Optical Repeaters," Electronics Letters, Nov. 21, 1985, pp. 1148–1149, vol. 21, No. 24.

* cited by examiner

*Primary Examiner*—Guy J. Lamarre
*Assistant Examiner*—Cynthia Britt
(74) *Attorney, Agent, or Firm*—Michael R. Cammarata

(57) ABSTRACT

An optical receiver configuration and method of controlling an optical signal receiver adjusts a decision threshold to reduce the bit error rate (BER). The receiver includes a comparator having a data input and a digital data output. An error detection & correction circuit provides an error signal representative of the number of corrected "1"s and "0"s in the data output from the comparator. Based on the error signal, a control circuit modifies the comparator decision threshold in a direction to reduce the BER of the receiver. Dynamic modification of the decision threshold may also be accomplished. A relative percentage error indicator is preferably used as the basis of changing the decision threshold value. The relative percentage error indicator may be used to determine how much to adjust the decision threshold at each iteration of the method to more quickly arrive at an acceptable decision threshold and prevent overshoot. A searching method may also be used to determine the usable range of the comparator before tuning the decision threshold.

25 Claims, 12 Drawing Sheets

| DAC | Ones | Zeros | Total errors | Diff/Total |
|---|---|---|---|---|
| 2502 | 17898325 | 4050 | 17902375 | 0.999547546 |
| 2504 | 32450069 | 4857 | 32454926 | 0.999700693 |
| 2506 | 13368701 | 5745 | 13374446 | 0.999140899 |
| 2508 | 11257620 | 7322 | 11264942 | 0.998700038 |
| 2510 | 9465373 | 8801 | 9474174 | 0.998142107 |
| 2512 | 7873139 | 10330 | 7883469 | 0.997379326 |
| 2514 | 6544202 | 12816 | 6557018 | 0.996090906 |
| 2516 | 5441469 | 15528 | 5456997 | 0.994308958 |
| 2518 | 4519664 | 19173 | 4538837 | 0.99155158 |
| 2520 | 3788423 | 22576 | 3810999 | 0.988152188 |
| 2522 | 3135094 | 27696 | 3162790 | 0.982486349 |
| 2524 | 2532165 | 33787 | 2565952 | 0.973665135 |
| 2526 | 2093195 | 40792 | 2133987 | 0.961769214 |
| 2528 | 1682342 | 49836 | 1732178 | 0.94245857 |
| 2530 | 1376353 | 59057 | 1435410 | 0.917714103 |
| 2532 | 1131256 | 71939 | 1203195 | 0.880420048 |
| 2534 | 885459 | 88140 | 973599 | 0.818933983 |
| 2536 | 715597 | 106058 | 821655 | 0.741842988 |
| 2538 | 567115 | 129109 | 696224 | 0.629116491 |
| 2540 | 460630 | 151690 | 612320 | 0.504540411 |
| 2542 | 371422 | 183149 | 554571 | 0.33949305 |
| 2544 | 293295 | 218546 | 511841 | 0.146039493 |
| 2542 | 229267 | 265260 | 494527 | -0.072782268 |
| 2544 | 277227 | 227935 | 505162 | 0.097576619 |
| 2542 | 226951 | 266724 | 493675 | -0.08056515 |

Figure 10

OPTICAL SIGNAL RECEIVER AND METHOD WITH DECISION THRESHOLD ADJUSTMENT BASED ON A RELATIVE PERCENTAGE ERROR INDICATOR

FIELD OF THE INVENTION

The present invention relates in general to receivers and methods of receiving for communication systems and, in particular, to an optical signal receiver and optical signal receiving method including decision threshold adjustment.

BACKGROUND OF THE INVENTION

It is well known that signals transported over optical communication networks suffer degradation between associated transmitters and receivers. Signal degradation may result from a variety of system parameters including the total transmission distance, the transmission fiber type, the number of optical amplifications to a signal, the number of system channels, etc.

Optical networks are, however, being developed with ever-increasing signal transmission speeds and distances. Channel counts have also been increasing in wavelength division multiplexed transmission systems. The greater transmission distances, speeds and higher channel counts directly effect received signal quality.

To maintain high fidelity signal reception in optical networks, advances in receiver design have been proposed. For example, receivers are constructed with the goal of achieving an acceptable BER (bit error rate), which is the ratio of the number of incorrectly received bits to the total number of received bits. Typically, this is achieved by adjusting and fixing the decision threshold of a comparator within the receiver while providing a well-known optical test signal at the comparator data input. The decision threshold is a reference voltage against which the strength of a received signal is compared. If the received signal is above the decision threshold, it is interpreted as being "on", but if the received signal is below the decision threshold, it is interpreted as being "off".

It is also known that a decision threshold may be established from the eye diagram of the received signal. An exemplary eye diagram is illustrated in FIG. 1a.

In general, an eye diagram may be observed on an oscilloscope by monitoring the receiver data output voltage on the vertical input of the oscilloscope and triggering on the data clock. Key features of an eye diagram, as illustrated in FIG. 1a, include the crossing points C1, C2, useable eye width (i.e. the time distance on the horizontal scale between points C1 and C2) and usable eye height H (voltage).

In an ideal received signal such as the one shown in FIG. 1a, the crossing points C1,C2 would be centered and symmetrical, and the open area would be as large as possible, indicating strong pulse width and height in the received signal. A decision threshold DT may be selected to correspond with the voltage level at the crossing points C1, C2, as shown. In contrast, a non-ideal received signal may have an eye diagram like the one shown in FIG. 1b in which the eye is not open and the crossing points are not centered or symmetric.

A difficulty with such receiver designs, however, is that the eye diagram itself depends on all of the above-mentioned parameters that effect signal quality. All these parameters can change with time, e.g. due to system upgrades to add more channels, changes in fiber plant, or changes in optical amplifier performance. Such changes can alter the received "eye diagram" such as in the eye diagram shown in FIG. 1b, leading to a degradation of the BER in the absence of a re-optimized decision threshold.

In an attempt to minimize the adverse effects of system changes, error correction schemes such as forward error correction (FEC) have been incorporated into receiver designs. FEC generally includes generation of a control code at the transmission site. The control code is transmitted with the data to a receiver. Error correction may be achieved based on various algorithms that compensate for specific detected errors in the control code. Although FEC schemes have achieved wide acceptance, there is room for improvement in basic receiver design that addresses the underlying BER variation resulting from changes in system parameters.

Accordingly, there is a need in the art for optical receiver configuration and/or optical signal control method that adjusts the receiver decision threshold to reduce the BER.

SUMMARY OF THE INVENTION

The present invention is organized about the concept of providing an optical receiver configuration and a method of controlling an optical signal receiver that adjusts a decision threshold that reduces the BER.

The receiver includes a comparator having a data input and a digital data output. An error correction and detection circuit provides an error calculation signal representative of errors in the data output from the comparator. Based on the error calculation signal, a control circuit modifies the comparator decision threshold and, preferably, a rate of comparison threshold adjustment to reduce the BER of the receiver.

In particular, an optical receiver consistent with the invention includes a photodetector optically coupled to a fiber optic network: said photodetector converting an optical signal received from the fiber optic network to an electrical input data signal; a comparator operatively coupled to said photodetector and to a decision threshold input port; said comparator comparing the electrical input data signal to a decision threshold signal to provide a digital output data signal; an error detection and correction circuit operatively coupled to said comparator, said error detection and correction circuit detecting errors in the digital output data signal and correcting detected errors in the digital output data signal; said error detection and correction circuit also providing an error signal representative of a number of corrected "1"s and number of corrected "0"s in the output data signal; and a control circuit operatively coupled to said error detection and correction circuit and to the decision threshold input port of said comparator, said control circuit calculating a relative percentage error indicator based on the error signal and adjusting the decision threshold signal in response to the relative percentage error indicator.

Moreover, the control circuit may change a rate of the decision threshold adjustment based on the relative percentage error indicator.

The control circuit may also include a microprocessor circuit for receiving the error signal and a digital to analog converter for providing the decision threshold signal, the microprocessor circuit providing a digital control signal to the digital to analog converter for controlling the decision threshold signal.

The error detection and correction circuit may include an FEC circuit and preferably outputs an error signal that may, for example, be representative the total number of "1"s and total number of "0"s corrected by the error detection and correction circuit.

The receiver may also include a clock and data recovery circuit for receiving the output data signal and providing the data output signal and a data input clock to the error detection circuit, and a photodiode may be provided whereby the data input signal is representative an optical data signal imparted on the photodiode.

An optical receiving method consistent with the invention may reduce bit errors in a digital data output signal output from an optical receiver having a comparator comparing an input data signal from an optical-to-electrical signal converter to a decision threshold signal to provide the digital output data signal. In particular, the method may include inputting a number of corrected "1"s and a number of corrected "0"s corrected in the output data signal; calculating a relative percentage error indicator based on the number of corrected "1"s and the number of corrected "0"s in the output data signal; and adjusting the decision threshold signal in response to the calculated relative percentage error indicator.

Moreover, the method may also change a rate of the decision threshold adjustment based on the calculated total percentage error indicator.

Alternatively, the method may change the decision threshold by a stepsize amount in response to the calculated relative percentage error indicator.

In another alternative, the method may change the decision threshold by a stepsize amount related to the calculated relative percentage error indicator.

BRIEF DESCRIPTION OF THE DRAWING

For a better understanding of the present invention, together with other objects, features and advantages, reference should be made to the following detailed description which should be read in conjunction with the following figures wherein like numerals represent like parts:

FIG. 10: is a chart of test data including DAC count, ones, zeroes, total errors, and difference/total that further illustrates aspects of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "coupled", "connection" and "operative connection" as used herein are relative terms and do not require a direct physical connection.

Figure 1A:
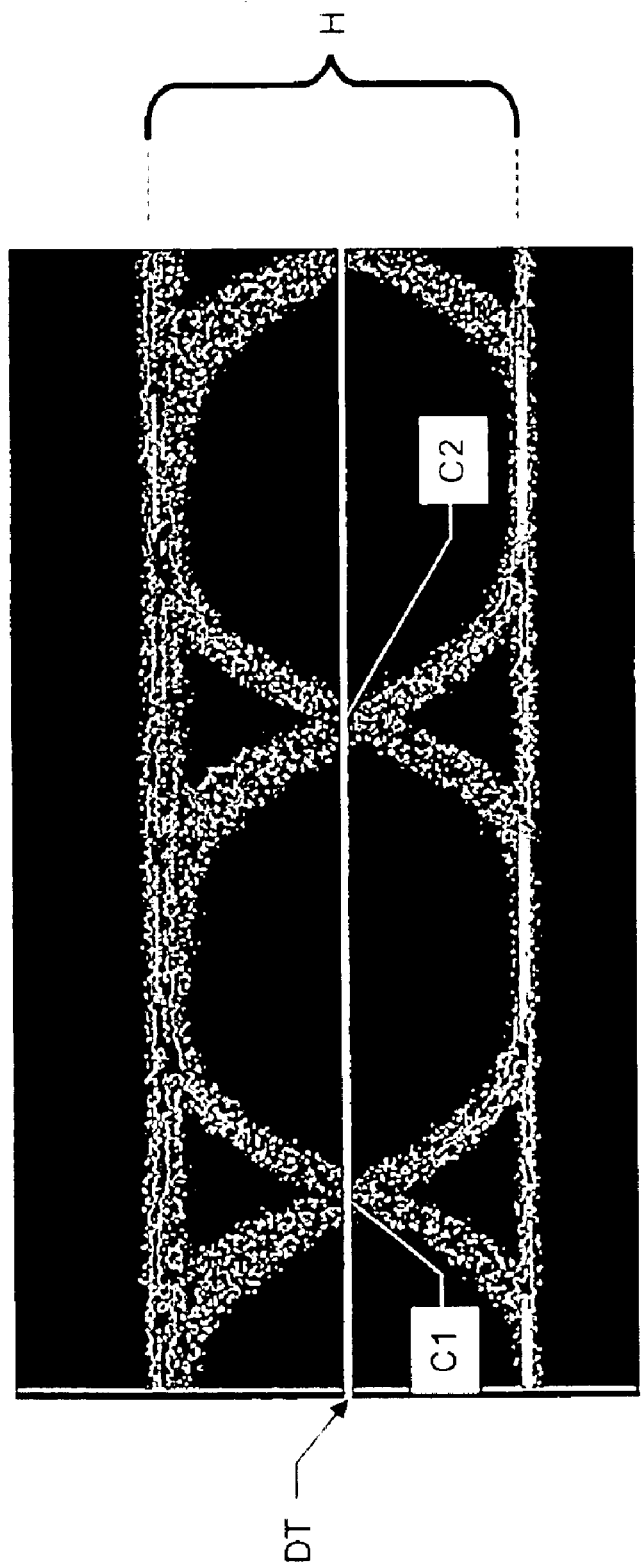
FIG. 1a: is an exemplary and conventional optical signal eye-diagram of a high-quality signal.
Figure 1B:
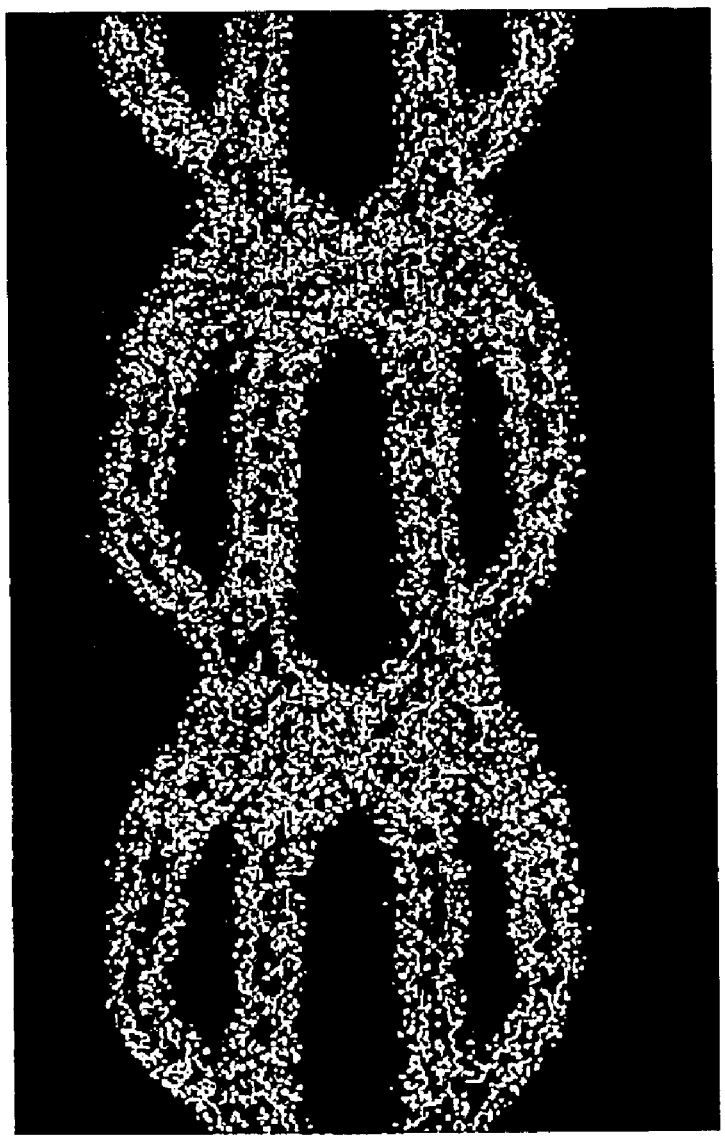
FIG. 1b: is an exemplary and conventional optical signal eye-diagram of a low-quality signal.
Figure 2:
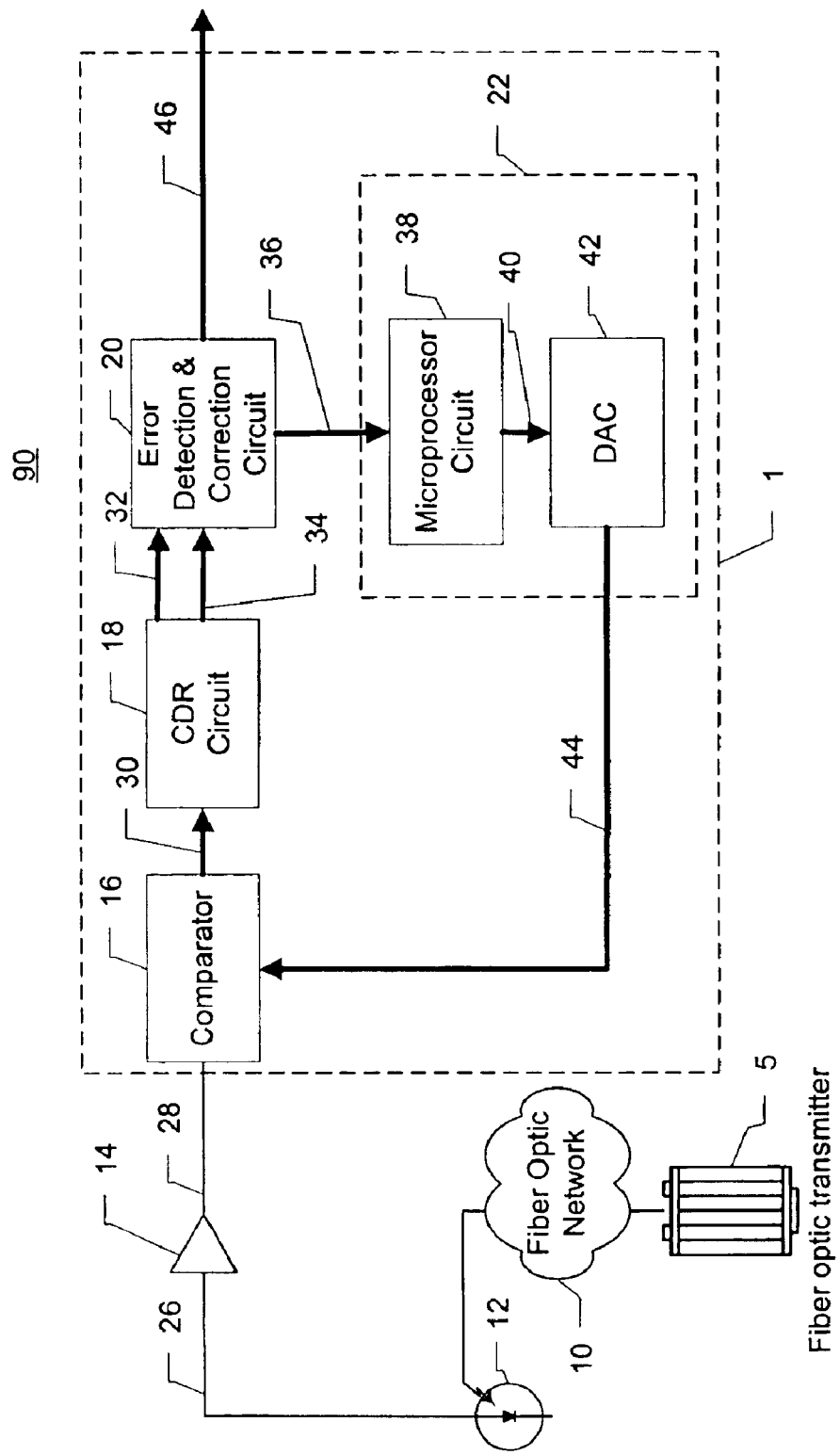
FIG. 2: is a block diagram of an exemplary receiver consistent with a first construction of the invention.

FIG. 2 illustrates an exemplary embodiment of a receiver circuit 1 consistent with the invention. The receiver circuit 1 is typically installed in a fiber optic system 90 as shown but it may also be located in a variety of other configurations. The fiber optic system 90 illustrated in FIG. 1 includes a fiber optic transmitter 5 that sends an optical signal to a photodetector 12 via a fiber optic network 10. The transmitter 5, fiber optic network 10 and photodetector 12 are conventional elements that may be constructed in a variety of manners as is known in the art.

The type of transmission modulation utilized by the transmitter 5 is not limited by the invention as the modulation is independent of error coding. For example, the invention may use "on"/"off" keying (OOK) for modulation whereby an optical pulse is transmitted in the "on" state—signaling a logical "1"—and the absence of the pulse corresponds to the "off" state—signaling a logical zero. Other modulation formats include RZ (return-to-zero), NRZ (non-return-to-zero), soliton, QAM (quadrature amplitude modulation) and QPSK (quadratic phase shift modulation).

The optical signal from transmitter 5 is received by photodetector 12 and converted thereby into an analog electrical signal. Of course, other elements may be used in place of or in conjunction with photodetector 12 to perform this O/E (optical-to-electrical) signal conversion. One example is the conventional limiting amplifier 14 which is an optional component whose intended purpose is to amplify and limit the signal from the photodiode 12 to a level that is appropriate for coupling to the receiver circuit 1 components.

As shown, the receiver circuit 1 may include a comparator 16 coupled to the output of the limiting amplifier 14; a clock and data recovery (CDR) circuit 18 coupled to the output of the comparator 16; an error detection & correction circuit 20 coupled to the output of the CDR circuit; and a control circuit 22 coupled to an error calculation output of the error detection & correction circuit 20.

In general, the control circuit 22 provides a decision threshold signal to the comparator 16 on line 44 and may dynamically adjust the decision threshold to reduce the BER in the receiver circuit 1 output, e.g. the output of the error detection & correction circuit 20 on line 46.

Although the illustrated embodiment includes particular circuit elements, those skilled in the art will recognize that a receiver consistent with the invention may have a variety of configurations. For example, the CDR circuit 18 and/or the limiting amplifier 14 may be omitted or replaced by other elements in a particular receiver It is to be understood, therefore, that the illustrated exemplary embodiment is provided only by way of illustration, not of limitation.

With continued reference to FIG. 2, in a manner well known to those skilled in the art, the photodiode 12 converts an optical signal imparted thereon into an analog electrical signal on line 26. The conventional limiting amplifier 14 amplifies and limits the signal from the photodiode to a level that is appropriate for coupling to the remainder of the receiver circuit 1 components. The analog output of the amplifier 14 is coupled to the data input of the comparator 16.

The function of the comparator 16 is well known to those skilled in the art. Generally, the comparator receives an analog data input on line 28, and a decision threshold input on line 44. The control circuit 22, in a manner to be described in detail below, generates the decision threshold, which is coupled to the comparator decision threshold input port on line 44. The comparator 16 outputs a digital "1" if the received data input signal on line 28 is above the voltage level of the decision threshold on line 44, and outputs a digital "0" if the received signal is below the decision threshold. In this manner, the data stream in the optical input signal is reconstructed as a digital electrical signal at the output of the comparator 16 on line 30.

In the illustrated exemplary embodiment, the output of the comparator 16 is coupled to a conventional clock and data recovery circuit 18 (CDR) which recovers the clock and data from the received serial input on line 30. Those skilled in the art will recognize that this function may be accomplished in a variety of ways, e.g. using a phase locked loop, saw filter, etc. Also, the CDR circuit 18 could be omitted from an embodiment consistent with the invention if its output is not required by the error detection & correction circuit 20.

In the illustrated embodiment, the clock and data are provided on separate outputs 32,34 of the CDR 18 and are coupled to the error detection & correction circuit 20. The error detection & correction circuit 20 provides an error signal on line 36. The error signal is representative of the number of errors received in the input data stream, and may be provided in a variety of forms, e.g. total number of received errors, numbers of corrected bits, etc but should preferably convey the number of corrected "1"s and the number of corrected "0"s. The error detection circuit 20 provides a corrected data output on line 46.

A variety of configurations for the error detection & correction circuit 20 will be apparent to those skilled in the art. For example, the error signal can be provided by FEC-type circuitry, which, as discussed above, provides error correction based on predefined algorithms. In this case, a corrected data output would be provided on line 46. The corrected data output would be derived from the particular FEC algorithm used, and would include a number "1"s corrected from "0"s in the input, and a number of "0"s corrected from "1"s in the input.

In a configuration where an FEC circuit is not necessary or desired, those skilled in the art will recognize other configurations of error detection & correction circuits. For example, data stream errors can be obtained from other error detection or error correction codes. If a data header and payload format is used such as in SONET or SDH, it is preferable to use coding that is outside of the payload in order to obtain a sense of directionality for the decision threshold change over multiple frames.

The error signal from the error detection & correction circuit 20 is coupled to the control circuit 22, which provides a decision threshold to the comparator 16 on line 44 based on or in response to the error signal.

In the illustrated exemplary embodiment shown in FIG. 2, the error signal on line 36 is coupled to an input of a microprocessor circuit 38. The microprocessor 38 performs some calculations and provides a digital output on line 40 to a conventional digital to analog converter 42 (DAC) for modifying the analog output of the DAC, which is provided as the comparator decision threshold on line 44.

The microprocessor circuit 38 may be constructed from, for example, a general purpose microprocessor, an application specific integrated circuit (ASIC), a field programmable gate array (FPGA), etc.

The analog output of the DAC 42 is increased or decreased by a corresponding increase or decrease in the number of DAC points (counts) provided from the processor 38 to the DAC 42 on line 40. A DAC point is, therefore, the digital input to the DAC 42 required to make a corresponding known change in the DAC analog output on line 26. For example, a one DAC point increase or decrease of the microprocessor output to the DAC may result in a corresponding increase or decrease of the DAC analog output by one millivolt. By modifying the digital input to the DAC 42 based on the error signal, the microprocessor 38 adjusts the output of the DAC 42 in a direction (i.e. either increasing or decreasing) to reduce the total number of errors in the receiver output data stream 46.

Of course, if the comparator 16 were capable of receiving a digital threshold signal then the DAC 42 could be eliminated and the microprocessor circuit 38 could directly output a digital threshold signal to the comparator 16. Moreover, the DAC may be included within the comparator 16 rather than within the control circuit 22.

Figure 3:
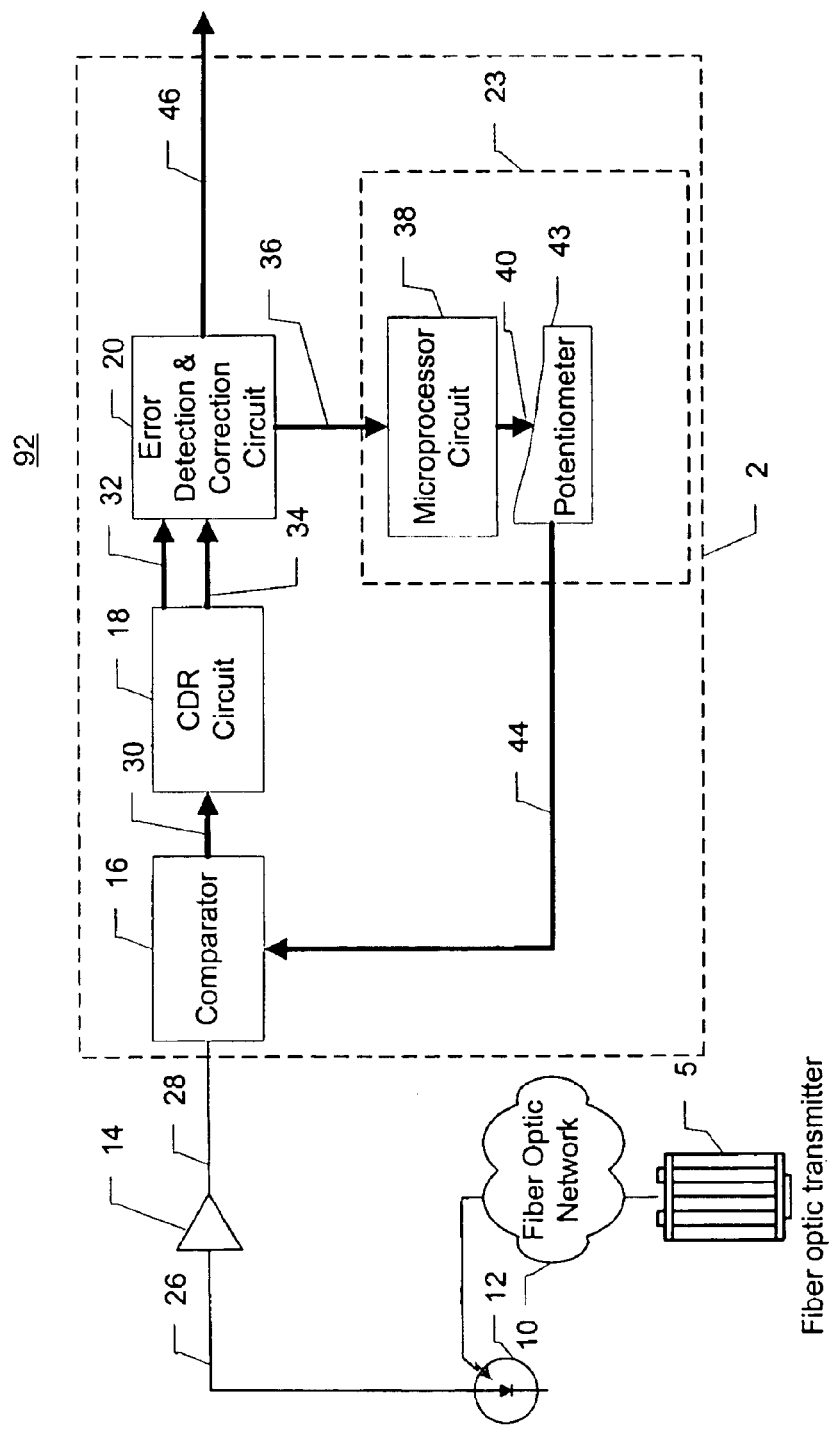
FIG. 3: is a block diagram of an exemplary receiver consistent with a second construction of the invention.

FIG. 3 illustrates another alternative construction of the invention. Generally speaking, the DAC 42 of FIG. 2 may be replaced with a potentiometer 43 as shown in FIG. 3. In other words, control circuit 23 may include a microprocessor circuit 38 and a potentiometer coupled to the microprocessor 38. The potentiometer 43 may receive a control signal from the microprocessor. This control signal would adjust the potentiometer 43 and, thereby, the threshold signal voltage supplied to the comparator 16.

Figure 4:
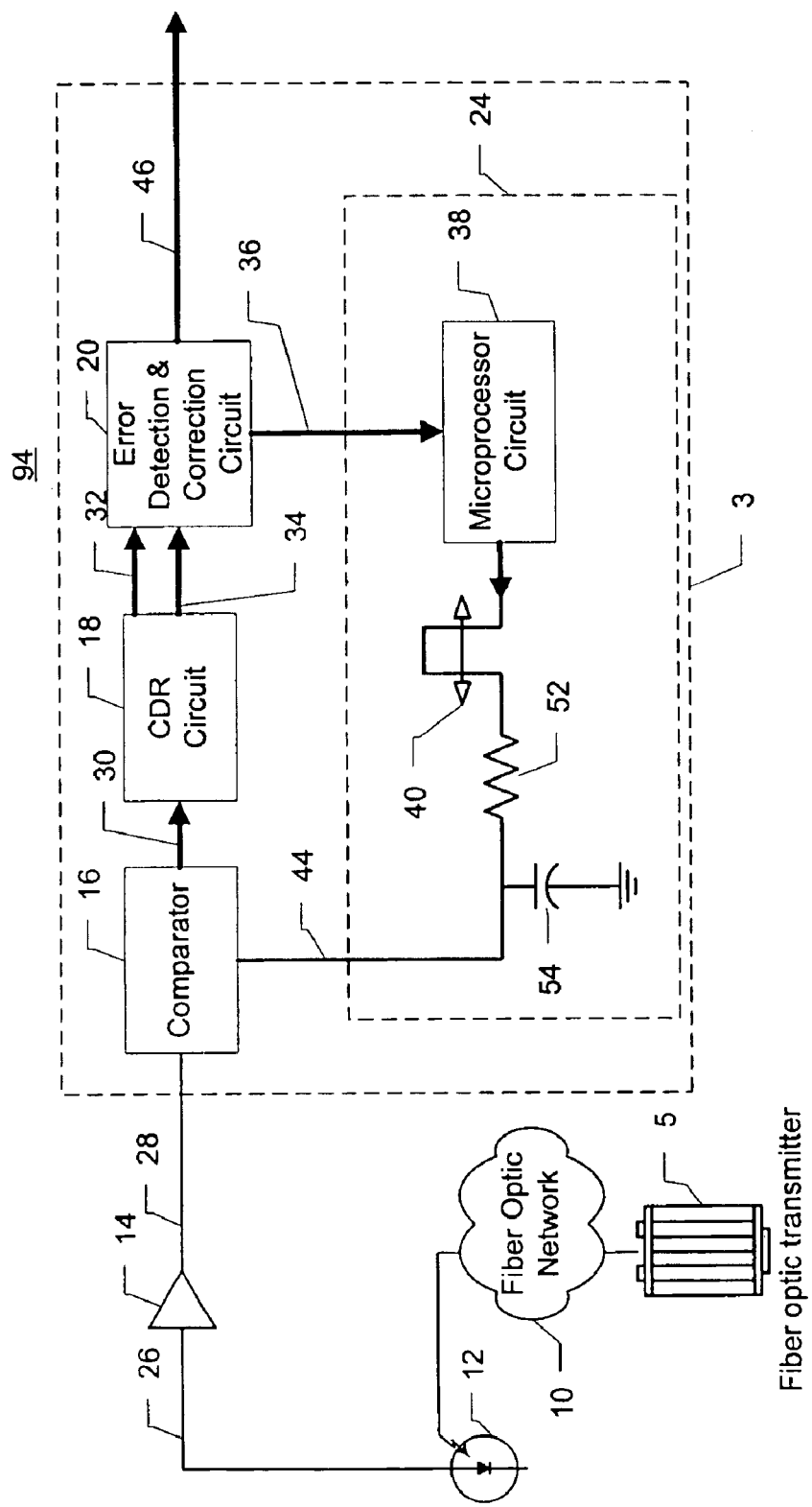
FIG. 4: is a block diagram of an exemplary receiver consistent with a third construction of the invention.

FIG. 4 illustrates yet another alternative construction. Generally speaking, a pulse-width modulated signal 40 may be used as the threshold signal in receiver circuit 3. More specifically, the microprocessor circuit 38 in control circuit 24 may output a pulse-width modulated signal 40 as the threshold signal and vary the width of the pulse to change the threshold. Instead of varying the pulse width of signal 40, the duty cycle and/or pulse height may be varied. An RC circuit including, for example, the resistor 52 and capacitor 54 shown in FIG. 4 may be used to condition the signal 40 before it is supplied as a threshold signal to the comparator 16.

Operation

Many devices used to construct comparator 16 have a dynamic range that exceeds the "usable" range of voltages of the received signal. In other words, comparator 16 may receive signals over line 28 having a voltage range that represent only a small portion of the dynamic range of the comparator 16. If one were to simply adjust the threshold signal without regard to this usable range then it may take an unacceptably long period of time to find an optimum or at least an acceptable threshold level due to this mismatch in ranges.

To reduce this time period and more rapidly find an acceptable threshold level for the comparator 16, it is preferable to first sweep the dynamic range of the comparator 16 to find the usable range. In other words, it is generally preferable to search for the usable range before adjusting the comparator 16 threshold to reduce BER. In this way, the threshold adjustments for receiver circuit tuning may be limited to this usable range or at least have a good starting point. In either case, an optimum or near-optimum threshold value may be found much more rapidly. This usable range search may be skipped or eliminated, if for example, the mismatch between dynamic and usable ranges is not so great. Furthermore, the search may be limited to range centered around a pre-configured, known or estimated decision threshold value to speed the searching process.

Figure 5:
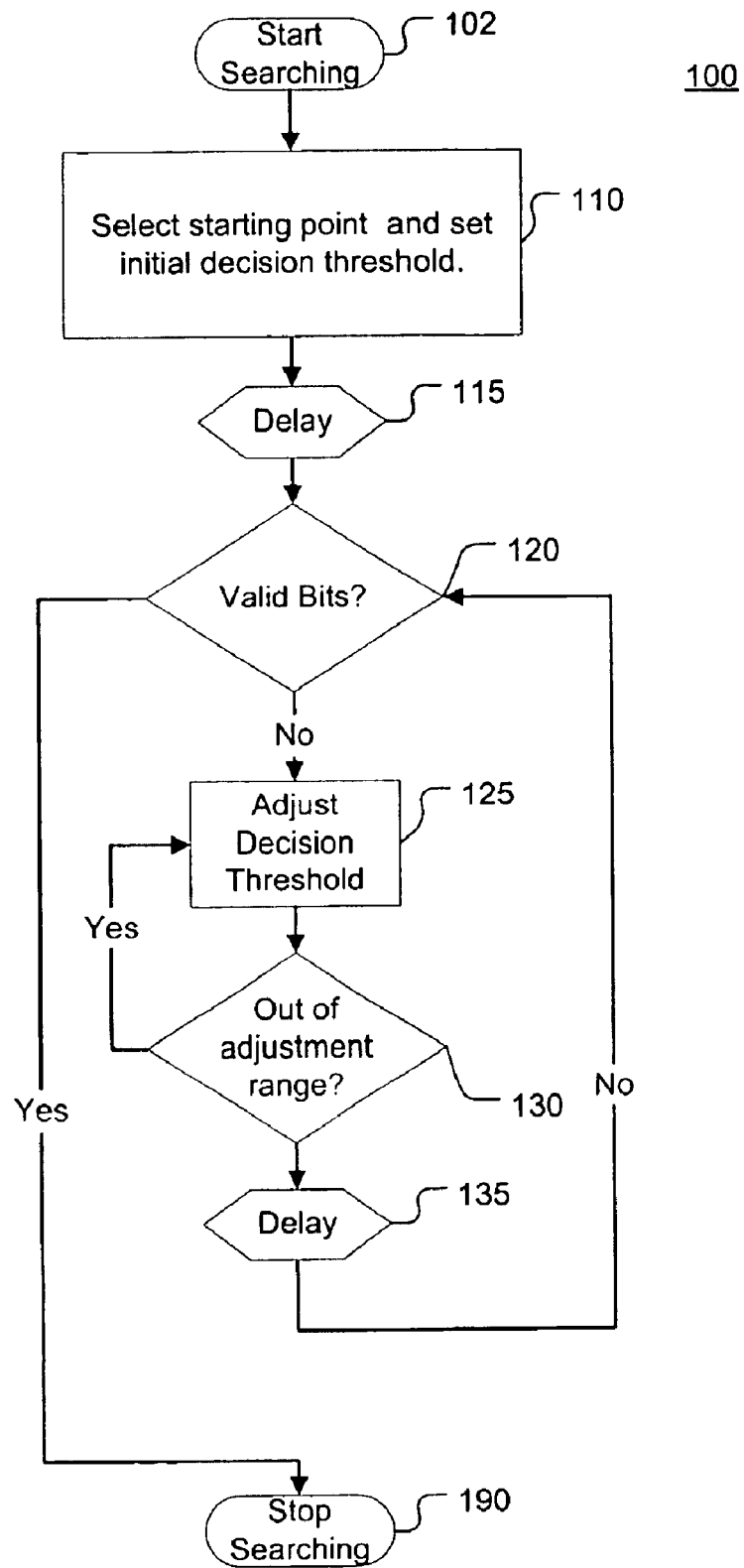
FIG. 5: is a flow chart illustrating a receiver searching operation consistent with the invention that may be performed by the exemplary receivers.

FIG. 5 illustrates one method 100 of searching the dynamic range for the usable range. This method 100 may be performed by any of the receiver circuits 22, 23, or 24 described above. Furthermore, this method 100 may be performed during a factory calibration set-up procedure, during a field calibration or at any time before live traffic will be carried. As will be recognized by those skilled in the art, the steps in the illustrated flow charts may be carried out by firmware embedded in the microprocessor 38, software stored in a memory device in or associated with the microprocessor 38 or a combination thereof.

As shown in FIG. 5, the searching method 100 may select a starting point and set the initial decision threshold (110). This may be accomplished by choosing a random starting point, a starting point at one end of the range, a known or configured value, or a point in the middle. In any event, the microprocessor circuit 38 generates a control signal that is used (e.g. via DAC 42) to send an initial decision threshold signal to the comparator 16. A delay (115) may then be introduced to, for example, permit the system to stabilize.

The searching method 100 shown in FIG. 5 continues by determining if valid bits are being received (120). In other words, the method determines if the decision threshold is at a level sufficient that valid bits are being received. The determination of whether valid bits are being received generally varies with the type of error coding method utilized. In the case of FEC, the bits may be deemed valid when the FEC OOF (out of frame) is false and the bits may be deemed invalid when this condition is true. In other words, the signal may be deemed valid when the FEC decoder in the error correction and detection circuit 20 can synchronize and recognize framing of the incoming signal.

As an alternative to using FEC OOF to determine whether the bits are valid in step 120 it is also possible to use SONET or SDH valid frame detection. While this is a possibility it is not preferred because the FEC frame is more sensitive than the SONET or SDH frames. Of course, coding algorithms other than FEC can be used to not only determine bit errors but also to determine whether the bits are valid. In other words, "valid" could be determined differently depending upon which coding method is used.

If valid bits are being received, then the method stops searching (190) and the microprocessor 38 can utilize the threshold signal level(s) associated with the valid bit(s) as a starting point for tuning the threshold to a more optimum value. In other words, the searching 100 algorithm gets the receiver into the ballpark so that the decision threshold may be tuned more quickly by the tuning algorithm (e.g. 200, 201, 300, 301 discussed below).

If no valid bits are being received, then the microprocessor 38 adjusts the decision threshold (125). A decision (130) is then made as to whether the decision threshold is out of range (130). For example, has the maximum or minimum DAC 42 count value been exceeded or does the potentiometer 43 have any adjustment left or has the search exceeded a pre-configured subset of the dynamic range centered. If the answer is yes, then the decision threshold must be adjusted to bring it back into range (e.g. changing the direction of adjustment or changing the starting point for adjustment). If not out of range, then another delay (135) may be introduced to permit the system to stabilize. The method then loops back to determine if valid bits are being received with this new threshold level (120).

The searching method 100 illustrated in FIG. 5 may also be modified to determine the range of decision thresholds in which valid bits are received instead of finding a single decision threshold value. In this way, the tuning of the decision threshold may be limited to this range and/or the system may be able to pick a better initial decision threshold (e.g. the middle of the range).

The range referred to in the decision (130) may be the entire dynamic range of the adjustment device (e.g. DAC 42) or it may comprise a subset of that range (e.g. +/−X counts centered about a configured value). It is generally preferred to use a subset of the entire dynamic range where the subset is centered about a configured or preset value so that the searching method takes a shorter amount of time.

Figure 6:
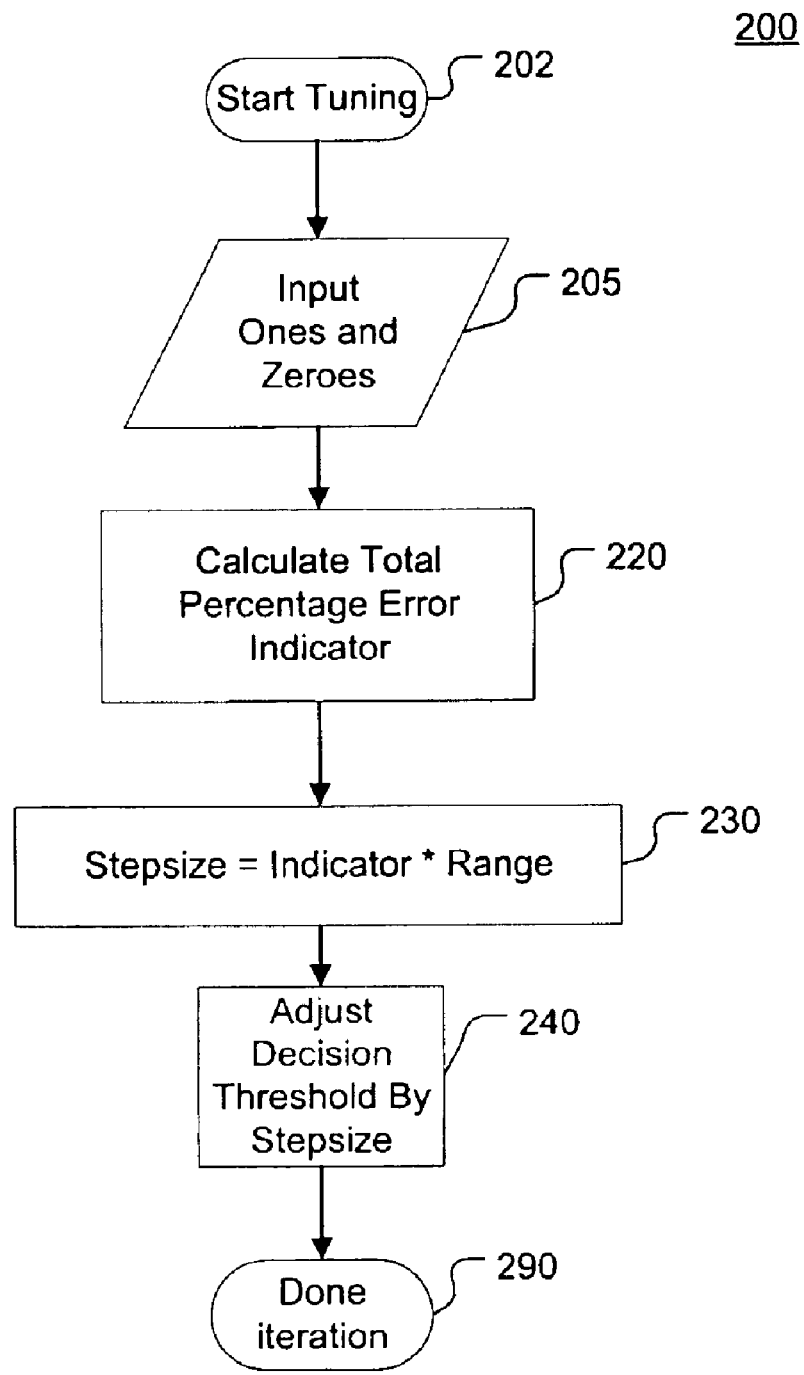
FIG. 6: is a flow chart illustrating a receiver threshold tuning operation consistent with the invention that may be performed by the exemplary receivers.

FIG. 6 is a flow chart illustrating a decision threshold tuning operation 200 of a receiver consistent with the invention. As will be recognized by those skilled in the art, the steps in the illustrated flow chart may be carried out by firmware embedded in the microprocessor 38, software stored in a memory device in or associated with the control circuit 22, or a combination thereof.

As show in FIG. 6, decision threshold tuning 200 may be a single non-repetitive event. In other words, the invention contemplates a single decision threshold adjustment and does not necessarily perform dynamic tuning in which a series of decision threshold adjustments are made.

After starting (202) the tuning process, the method inputs (205) the number of corrected "1"s and "0"s. As described above, the error detection & correction circuit 20 outputs an error signal on line 36 that includes or otherwise represents the number of corrected "1"s and "0"s corrected in the data stream from comparator 16.

The tuning method may then perform a calculation (220) based on this error signal. The preferred method calculates a total percentage error indicator which is a measure of the total percentage success of the comparator 16 in accurately deciding between "1"s and "0"s. The percentage error indicator preferably includes a total number of corrected bits so as to normalize the value. In other words, the total percentage error indicator preferably measures the percentage success or failure of the comparator 16 to make binary decisions where the percentage is preferably in relation to the total number of errors (or corrected bits). The most preferred form of this calculation applies the following equation:

$$\text{Indicator} = \left| \frac{(\text{Ones} - \text{Zeroes})}{(\text{Ones} + \text{Zeroes})} \right|,$$

where Indicator=total percentage error indicator,
Ones=the number of corrected "1"s in the output data signal, and
Zeroes=the number of corrected "0"s in the output data signal.

The total percentage error indicator may be used in a variety of fashions to arrive at an updated decision threshold signal. A direct calculation of the threshold signal value may be made based on the total percentage error indicator. The preferred embodiment, however, utilizes the total percentage error indicator to determine the amount of change applied to the current decision threshold value.

In other words, the total percentage error indicator is preferably used to determine how much the decision threshold should be altered. A large total percentage error indicator means that the decision threshold is "lopsided" or skewed too far towards either the "1"s or "0"s and should be rapidly changed. A small total percentage error indicator means that the decision threshold is close to being ideal and that smaller changes should be made to the decision threshold. In this way, the invention may rapidly arrive at a decision threshold value without overshooting and thereby reduces the BER.

One way of formalizing this concept is to mathematically state the relationship between the stepsize (the amount that the decision threshold should be changed), the Indicator, and the Range as follows:

stepsize amount=Indicator*Range, where
Indicator=total percentage error indicator, and
Range=the range of stepsizes (e.g. the difference between the maximum stepsize and the minimum stepsize).

While this equation form is best stated for receiver 1 shown in FIG. 2 where a DAC 42 is used (points or counts relate to the stepsize amount) the concepts apply equally to the potentiometer embodiment (FIG. 3), the pulse-width modulator embodiment (FIG. 4), or other constructions of a receiver capable of changing the decision threshold. In general, the term "stepsize amount" refers to any change or alteration (either directly or indirectly) of the decision threshold value. A large "stepsize amount" infers a large alteration in the decision threshold and does not necessarily imply discrete values.

FIG. 10 is an example showing sample values for the number of corrected "1"s, "0"s, total errors and the total preferred percentage error indicator (Diff/Total). At the top of the chart one can see that the receiver is quite out-of-tune: a large total number of errors are being corrected indicating a very out-of-tune receiver. Significantly, there is a large difference between the number of corrected "1"s and the number of corrected "0"s with the number of corrected "1"s far exceeding the number of corrected "0"s. The invention recognizes this difference by calculating a total percentage error indicator (Diff/Total) that is close to unity thereby indicating a large change (large stepsize amount) in the decision threshold is needed to reduce the BER.

In contrast, the bottom of the FIG. 10 table shows a receiver having an optimal or nearly-optimal decision threshold tuning: the number of corrected "1"s nearly equals the number of corrected "0"s and the total number of errors is substantially reduced compared with the top of the chart.

Figure 9:
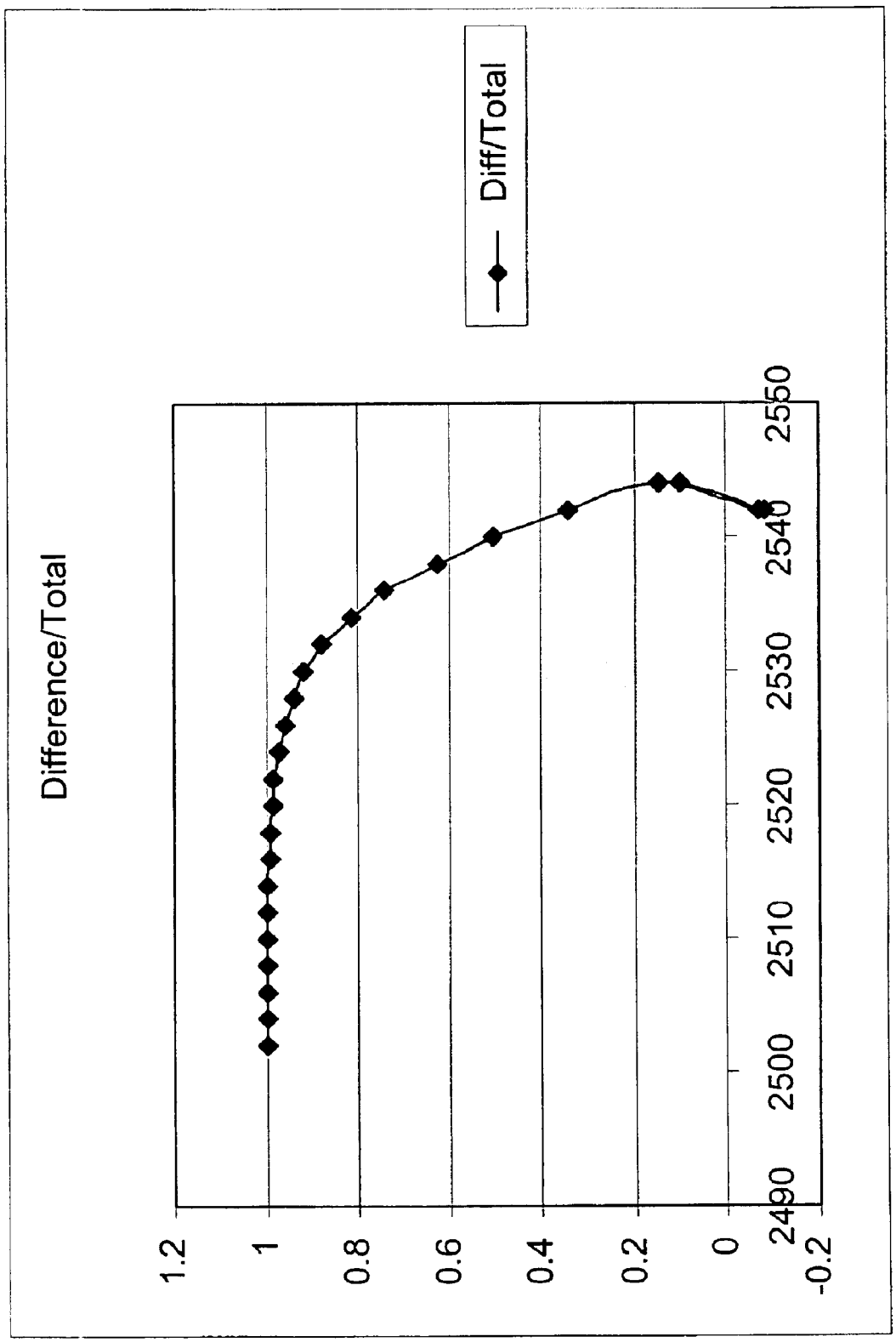
FIG. 9: is a plot of an exemplary percentage error indicator (difference/total) vs. DAC output that illustrates aspects of the invention.

FIG. 9 is a graph of the preferred total percentage error indicator (Diff/Total) as a function of DAC counts (related to the decision threshold value). FIG. 9 plots the values shown in the table of FIG. 10. Both FIG. 9 and FIG. 10 are proof of concept illustrations showing that the total percentage error indicator serves as an excellent basis for changing the decision threshold. As shown therein, a large indicator value (near unity) corresponds quite nicely with a highly out-of-tune decision threshold. Likewise, a small indicator value (near zero) corresponds quite nicely with a relatively in-tune receiver where the number of corrected "1"s is nearly equal to the number of corrected "0"s meaning that the decision threshold is close to optimum. While errors are still observed the receiver is not to blame and is making accurate decisions between "1"s and "0"s.

FIGS. 9 and 10 do not show the preferred receiver operation in which the stepsize of decision threshold adjustment is changed according to the size of the total percentage error indicator. Instead, the DAC count (related to the decision threshold value) is changed by increments of 2 in order to show that the total percentage error indicator is an excellent basis for changing the decision threshold.

Figure 7:
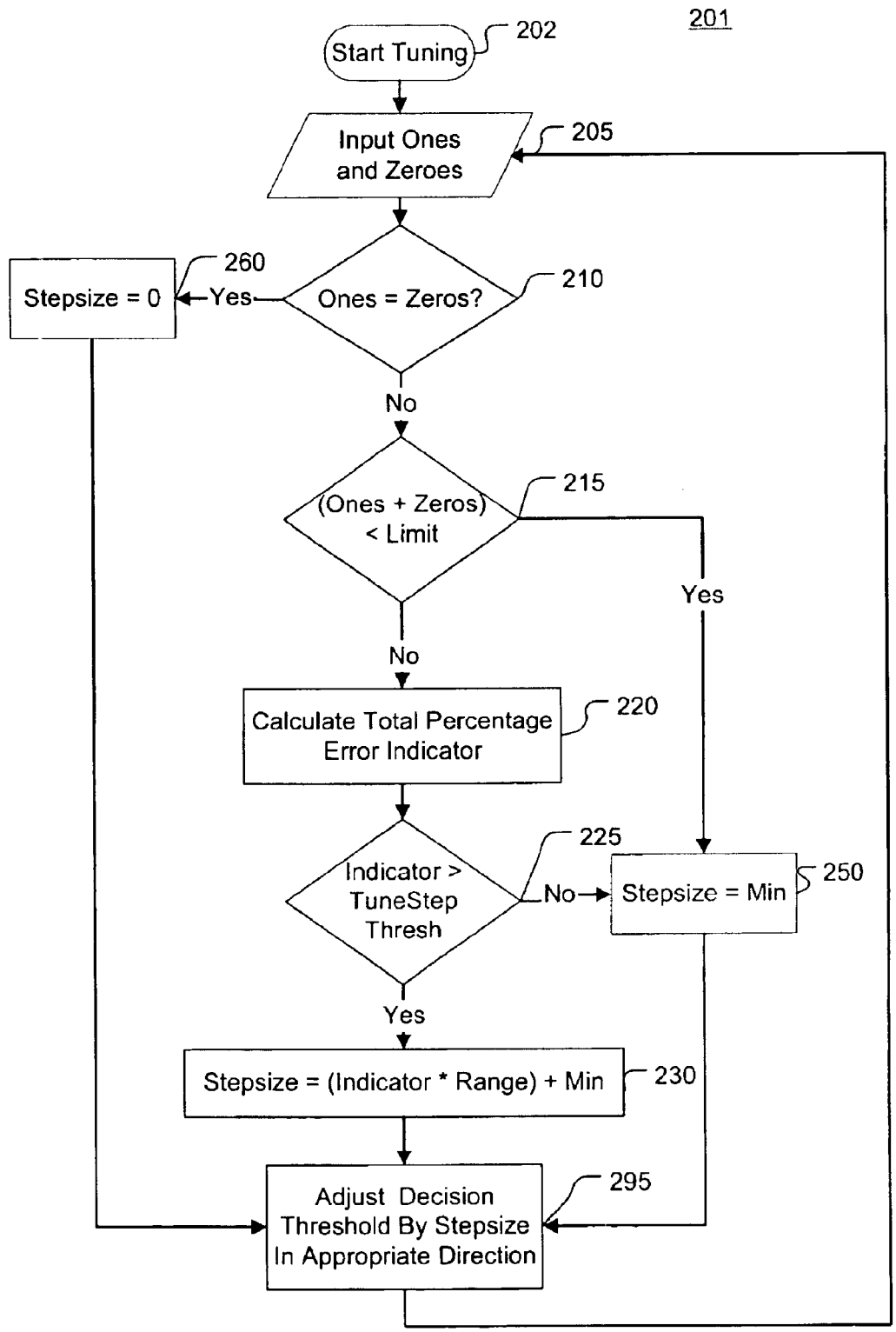
FIG. 7: is a flow chart illustrating an alternative receiver threshold tuning operation consistent with the invention that may be performed by the exemplary receivers.

FIG. 7 illustrates the preferred method of dynamically tuning the decision threshold. The dynamic tuning of FIG. 7 shares many steps with the one-shot tuning of FIG. 6.

In general, the dynamic tuning method (preferred over the one-shot tuning) iteratively adjusts the decision threshold. Certain limits are preferably placed on the adjustment such as setting the stepsize to a minimum amount when the number of corrected errors or the indicator are less than certain values. The preferred method also sets the stepsize to zero when the number of corrected ones equal the number of corrected zeros.

These preferred additions to the dynamic threshold tuning may be performed using the flowchart of FIG. 7. As shown therein, after starting (202) the dynamic tuning method 201 the method inputs (205) the number of corrected "1"s and "0"s. As described above, the error detection & correction circuit 20 outputs an error signal on line 36 that includes or otherwise represents the number of corrected "1"s and "0"s corrected in the data stream from comparator 16. The input (205) process may read the number of corrected "1"s and "0"s for a certain time period such a few seconds to gather a sufficient data set to make informed threshold tuning decisions.

The dynamic tuning method 201 then decides (210) whether an acceptable decision threshold value has been reached. This may be done by determining if the number of corrected "1"s equals the number of corrected "0"s (Ones= Zeros). If so, then the stepsize is set (260) to zero meaning that no change will be made to the decision threshold value in this iteration.

If an acceptable decision threshold value has not been reached, then the method determines (215) if the decision threshold value is close to being acceptable. This may be done by comparing the total number of errors (e.g. Ones+ Zeros) with a threshold value. If the total number of errors is below this threshold then the stepsize is set (250) to a minimum value. In other words, only a minimal adjustment should be made to the decision threshold value to prevent overshoot of the acceptable value.

If the total number of errors exceeds the threshold value then the method proceeds by determining an appropriate stepsize amount. First, the total percentage error indicator is calculated (220) to measure the percentage success or failure of the comparator 16 to make binary decisions where the percentage is preferably in relation to the total number of errors (or corrected bits). The most preferred form of this calculation applies the following equation:

$$\text{Indicator} = \left| \frac{(\text{Ones} - \text{Zeroes})}{(\text{Ones} + \text{Zeroes})} \right|,$$

where Indicator=total percentage error indicator,
Ones=the number of corrected "1"s in the output data signal, and
Zeroes=the number of corrected "0"s in the output data signal.

The invention may then decide whether to make a minimum adjustment to the decision threshold value or whether a larger adjustment is appropriate. This may be done by deciding (225) whether the indicator exceeds a threshold value. If not, then the method sets (250) the stepsize to a minimum value. If yes, then a larger adjustment is appropriate.

The threshold values utilized by the invention vary depending upon a variety of factors such as the model and type of hardware utilized to construct the receiver, the optical network, and the received signal strength and quality.

As with the method of FIG. 6, the dynamic tuning method of FIG. 7 utilizes the total percentage error indicator to determine (230) the amount of change applied to the current decision threshold value. Mathematically this determination (230) may be expressed as follows:

stepsize amount=Indicator*Range, where
  Indicator=total percentage error indicator, and
  Range=the range of stepsizes (e.g. the difference between the maximum stepsize and the minimum stepsize).

Again, while this equation form is best stated for receiver 1 shown in FIG. 2 where a DAC 42 is used (points or counts relate to the stepsize amount) the concepts apply equally to the potentiometer embodiment (FIG. 3), the pulse-width modulator embodiment (FIG. 4), or other constructions of a receiver capable of changing the decision threshold. In general, the term "stepsize amount" refers to any change or alteration (either directly or indirectly) of the decision threshold value. A large stepsize amount infers a large alteration in the decision threshold.

After determining (230) the stepsize amount, the invention may then proceed to actually change (295) or otherwise adjust the decision threshold by the stepsize amount. The microprocessor 38 may perform this adjustment by adjusting the DAC count (FIG. 1), the potentiometer (FIG. 2), or the pulse-width modulated signal (FIG. 3) or by effecting any other change of the decision threshold value of another receiver design consistent with the concepts of the invention.

The direction of change (+/−) may be inferred by the relative number of corrected "1"s and "0"s. For example, given that there is a direct relationship with decision threshold, and number of corrected "1"s, if the number of corrected "1"s exceeds the number of "0"s then the decision threshold is too high and must be reduced. Likewise, if the number of corrected "0"s exceeds the number of "1"s then the decision threshold is too low and must be increased. Of course, other ways of inferring the stepsize sign may be used and still be consistent with the concepts of the invention.

After adjusting (295) the decision threshold, the method 201 then loops back to the input (205) step. Iterations of the method 201 may continue in the fashion described above to continuously and dynamically modify the comparator decision threshold to reduce the BER for the received data.

Figure 8A:
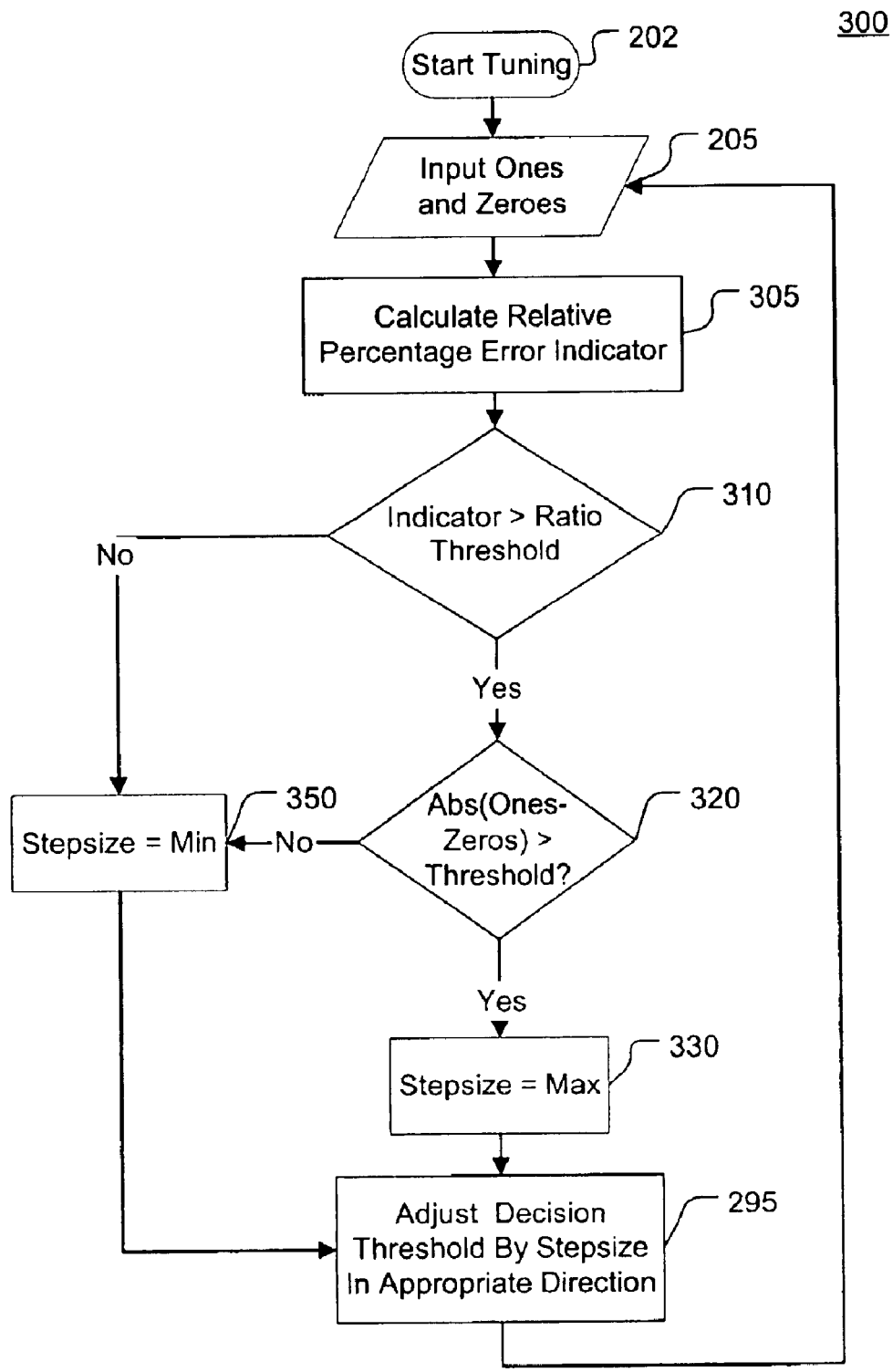
FIG. 8a: is a flow chart illustrating another alternative receiver threshold tuning operation consistent with the invention that may be performed by the exemplary receivers.

FIG. 8a illustrates another method of dynamically tuning the decision threshold based on a different indicator (a relative percentage error indicator as opposed to the total percentage error indicator described above). The dynamic tuning of FIG. 8a shares many steps with the one-shot tuning of FIG. 6 and the dynamic tuning of FIG. 7. Therefore, detailed explanations of shared steps will not be repeated here.

As shown in FIG. 8a, the alternative decision threshold tuning method 300 inputs (205) Ones and Zeros after starting (202) the tuning process. Then, a relative percentage error indicator is calculated (305). In this alternative, the relative percentage error indicator is calculated as follows:

Indicator=Ones/Zeros or Zeros/Ones depending upon which is greater than 1.

In other words:

Indicator=Ones/Zeros when Ones/Zeros≧1 and

Indicator=Zeros/Ones when Zeros/Ones≧1

The tuning method 300 then decides (310) whether the Indicator exceeds a Ratio Threshold. If yes, then another decision (320) is made in which the absolute value of Ones−Zeros is tested against another Threshold (e.g. if |Ones−Zeros|>SecondThreshold, then the method sets (330) the stepsize to a maximum value. In other words, there is large difference between the number of corrected Ones and Zeros which indicates that the decision threshold is not close to an optimal value and should be rapidly changed (e.g. by setting the stepsize to a maximum value). Otherwise (|Ones−Zeros|≦SecondThreshold), the stepsize is set to a minimum value (the decision threshold is close to optimum and should be changed by small increments to prevent overshoot).

After determining the stepsize (330 or 350), the method may then adjust (295) the decision threshold by the stepsize in the appropriate direction as described in more detail above.

Figure 8B:
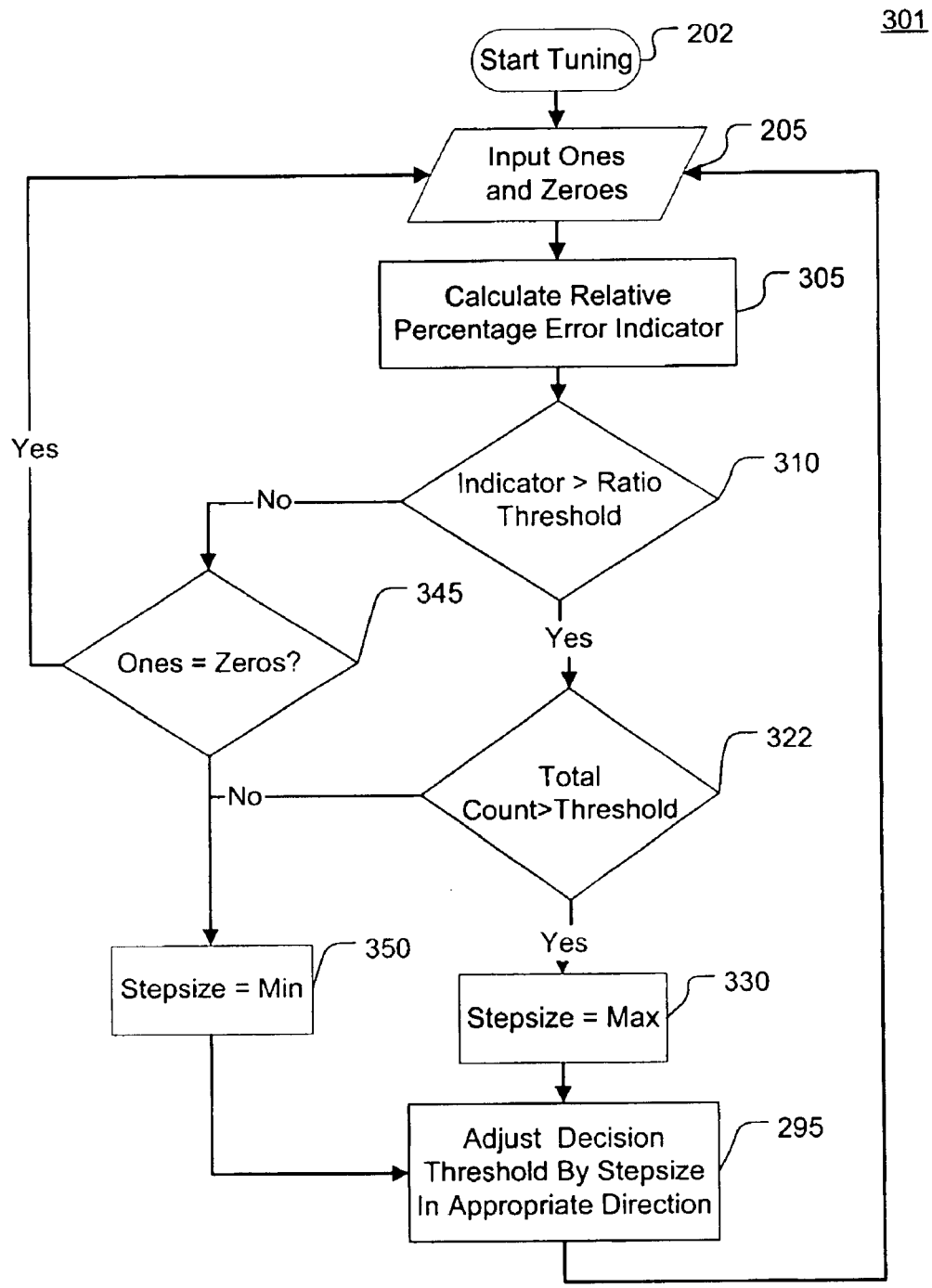
FIG. 8b: is a flow chart illustrating yet another alternative receiver threshold tuning operation consistent with the invention that may be performed by the exemplary receivers.

FIG. 8b illustrates another method (301) of dynamically tuning the decision threshold based on a relative percentage error indicator. The dynamic tuning of FIG. 8b shares many steps with tuning illustrated in FIGS. 8b, 7 and 6. Therefore, detailed explanations of shared steps will not be repeated here.

An additional feature of the tuning method 301 illustrated in FIG. 8b is the no decision threshold adjustment path. Specifically, a decision (345) may be made as to whether the number of corrected Ones equals the number of corrected Zeros. If so, then it may be presumed that an acceptable decision threshold has been reached since there is an even split between corrected Ones and Zeros. FIG. 8b illustrates this no adjustment path by looping back to the input (205) step after determining that the number of corrected Ones equals the number of corrected Zeros. A similar no adjustment path may be added to the tuning method 300 illustrated in FIG. 8a.

The FIG. 8b tuning method 301 also uses a Total Count value (as opposed to the absolute value of Ones−Zeros) to further determine the stepsize value. Specifically, a decision (322) is made in which the Total Count (total number of corrected Ones and corrected Zeros) is tested against another Threshold (e.g. if TotalCount>ThirdThreshold, then the method sets (330) the stepsize to a maximum value. In other words, there a large number of errors need to corrected then this indicates that the decision threshold is not close to an optimal value and should be rapidly changed (e.g. by setting the stepsize to a maximum value). Otherwise (TotalCount≦ThirdThreshold), the stepsize is set to a minimum value (the decision threshold is close to optimum and should be changed by small increments to prevent overshoot).

It is to be understood that the illustrated flow charts are provided by way of explanation, not of limitation. Alternative methods adjusting the comparator decision threshold in manner consistent with the invention will be apparent to those skilled in the art.

There is thus provided an optical receiver configuration that dynamically adjusts the receiver decision threshold to achieve and maintain an optimized system BER. Consistent with the invention, the receiver includes a control circuit (e.g. 22, 23 or 24) in a feedback loop. The control circuit adjusts a decision threshold to a comparator based on error rate information derived from the data stream and, preferably, the comparator decision threshold is adjusted at a rate that varies according to the indicator.

Generally speaking the inventive systems and methods disclosed herein are independent of the modulation format. In other words, the invention is not restricted to any specific modulation format (e.g. OOK, RZ, NRZ, soliton, QAM and QPSK) and may be applied to any known or future-developed modulation format.

The inventive concepts are quite useful for rapidly and accurately adapting the decision threshold to reduce the number of errors. A variety of factors in the optical network may influence what decision threshold value reduces errors including factors such as cross phase modulation, four wave mixing, self phase modulation, OSNR changes, Raman crosstalk, stimulated Brillion scattering, and jitter. Moreover, these factors are influenced by fiber type, weather the fiber is in, number of channels, length of spans, types of amplifiers, launch power into fiber from transmitter and a variety of other effects in the fiber itself. The invention compensates for all of these factors and influences by intelligently adjusting the decision threshold as described above in detail.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An optical signal receiver, comprising:
    a photodetector optically coupled to a fiber optic network;
    said photodetector converting an optical signal received from the fiber optic network to an electrical input data signal;
    a comparator operatively coupled to said photodetector and to a decision threshold input port;
    said comparator comparing the electrical input data signal to a decision threshold signal to provide a digital output data signal;
    an error detection and correction circuit operatively coupled to said comparator;
    said error detection and correction circuit detecting errors in the digital output data signal and correcting detected errors in the digital output data signal;
    said error detection and correction circuit also providing an error signal representative of a number of corrected "1"s and a number of corrected "0"s in the output data signal; and
    a control circuit operatively coupled to said error detection and correction circuit and to the decision threshold input port of said comparator;
    said control circuit calculating a relative percentage error indicator based on the error signal and adjusting the decision threshold signal in response to the relative percentage error indicator.

2. The optical signal receiver according to claim 1,
    said control circuit changing a rate of the decision threshold adjustment based on the relative percentage error indicator.

3. The optical signal receiver according to claim 2,
    said control circuit calculating the relative percentage error indicator according to:

Indicator=Ones/Zeros when Ones/Zeros≧1 and

Indicator=Zeros/Ones when Zeros/Ones≧1 where Indicator=relative percentage error indicator,
    Ones=the number of corrected "1"s in the output data signal, and
    Zeroes=the number of corrected "0"s in the output data signal.

4. The optical signal receiver according to claim 3,
    said control circuit setting the stepsize amount to a minimum value when the Indicator is below a first threshold value.

5. The optical signal receiver according to claim 3,
    said control circuit setting the stepsize amount to a maximum value when the Indicator is above a first threshold value and when

|Ones−Zeros|>SecondThreshold.

6. The optical signal receiver according to claim 3,
    said control circuit setting the stepsize amount to a maximum value when the Indicator is above a first threshold value and when TotalCount>ThirdThreshold where TotalCount=Ones+Zeros.

7. The optical signal receiver according to claim 1,
    said control circuit dynamically adjusting the decision threshold signal in response to the relative percentage error indicator.

8. The optical signal receiver according to claim 1, said control circuit including:
    a microprocessor circuit operatively coupled to said error detection and correction circuit,
    said microprocessor circuit performing the relative percentage error indicator calculation, and outputting a digital control signal based on the relative percentage error indicator; and
    a digital-to-analog converter operatively coupled to said microprocessor circuit and to the decision threshold input port,
    said digital-to-analog converter adjusting the decision threshold signal based on the digital control signal provided by said microprocessor circuit.

9. The optical signal receiver according to claim 1, said control circuit including
    a microprocessor circuit operatively coupled to said error detection and correction circuit, said microprocessor circuit performing the relative percentage error indicator calculation, and outputting a control signal based on the relative percentage error indicator; and
    a potentiometer operatively coupled to said microprocessor circuit and to the decision threshold input port, said potentiometer generating the decision threshold signal based on the control signal provided by said microprocessor circuit to thereby adjust the decision threshold signal.

10. The optical signal receiver according to claim 1, said control circuit including
    a microprocessor circuit operatively coupled to said error detection and correction circuit; and an RC circuit operatively coupled to said microprocessor circuit and to the decision threshold input port;

said microprocessor circuit performing the relative percentage error indicator calculation, and adjusting the decision threshold signal with a pulse-width modulated signal.

11. The optical signal receiver according to claim 1, wherein said error detection and correction circuit includes an FEC circuit.

12. The optical signal receiver according to claim 1, further comprising:

a clock and data recovery circuit operatively coupled between said comparator and said error detection and correction circuit, said clock and data recovery circuit providing a data-recovered output signal and a clock signal to said error detection and correction circuit.

13. A method of reducing bit errors in a digital data output signal output from an optical receiver having a comparator comparing an input data signal from an optical-to-electrical signal converter to a decision threshold signal to provide the digital output data signal, the method comprising:

inputting a number of corrected "1"s and a number of corrected "0"s corrected in the output data signal;

calculating a relative percentage error indicator based on the number of corrected "1"s and the number of corrected "0"s in the output data signal; and adjusting the decision threshold signal in response to the calculated relative percentage error indicator.

14. The method of reducing bit errors according to claim 13, further comprising:

changing a rate of said decision threshold adjustment based on the calculated relative percentage error indicator.

15. The method of reducing bit errors according to claim 13, further comprising:

repeating said inputting, calculating and adjusting to dynamically adjust the decision threshold.

16. The method of reducing bit errors according to claim 13, said adjusting step changing the decision threshold by a stepsize amount in response to the calculated relative percentage error indicator.

17. The method of reducing bit errors according to claim 13, said calculating step calculating the relative percentage error indicator according to:

Indicator=Ones/Zeros when Ones/Zeros≧1 and

Indicator=Zeros/Ones when Zeros/Ones≧1 where Indicator=relative percentage error indicator,
Ones=the number of corrected "1"s in the output data signal, and Zeroes=the number of corrected "0"s in the output data signal.

18. The method of reducing bit errors according to claim 17, said adjusting step changing the decision threshold by a stepsize amount in response to the calculated relative percentage error indicator.

19. The method of reducing bit errors according to claim 18, further comprising:

setting the stepsize amount to a minimum value when the Indicator is below a first threshold value.

20. The method of reducing bit errors according to claim 18, further comprising:

setting the stepsize amount to a maximum value when the Indicator is above a first threshold value and when

|Ones−Zeros|>SecondThreshold.

21. The method of reducing bit errors according to claim 18, further comprising:

setting the stepsize amount to a minimum value when the Indicator is below a first threshold value; and setting the stepsize amount to a maximum value when the Indicator is above a first threshold value and when

|Ones−Zeros|>SecondThreshold.

22. The method of reducing bit errors according to claim 21, further comprising:

determining a direction of change to be effected by said adjusting the decision threshold signal.

23. The method of reducing bit errors according to claim 18, further comprising:

setting the stepsize amount to a minimum value when the Indicator is below a first threshold value; and setting the stepsize amount to a maximum value when the Indicator is above a first threshold value and when TotalCount>ThirdThreshold where TotalCount=Ones+Zeros.

24. The method of reducing bit errors according to claim 23, further comprising:

determining a direction of change according to a relative number of corrected "1"s and "0"s.

25. A method of reducing bit errors in a digital data output signal output from an optical receiver having a comparator comparing an input data signal from an optical-to-electrical signal converter to a decision threshold signal to provide the digital output data signal, the method comprising:

inputting a number of corrected "1"s and a number of corrected "0"s corrected in the output data signal; and adjusting the decision threshold signal based on the number of corrected "1"s and a number of corrected "0"s corrected in the output data signal.

* * * * *